US008189067B2

(12) United States Patent  
Dalton et al.

(10) Patent No.: US 8,189,067 B2
(45) Date of Patent: May 29, 2012

(54) DETERMINING THE ILLUMINANT IN A CAPTURED SCENE

(75) Inventors: Dan L. Dalton, Greeley, CO (US); Andrew C. Goris, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 396 days.

(21) Appl. No.: 12/533,452

(22) Filed: Jul. 31, 2009

(65) Prior Publication Data

US 2011/0025878 A1 Feb. 3, 2011

(51) Int. Cl.
 *H04N 9/73* (2006.01)

(52) U.S. Cl. .................................. 348/224.1; 348/223.1

(58) Field of Classification Search ............... 348/223.1, 348/650, 258, 261, 224.1
See application file for complete search history.

(56) References Cited

U.S. PATENT DOCUMENTS

| 2006/0268131 | A1* | 11/2006 | Cutler | 348/239 |
| 2008/0278601 | A1* | 11/2008 | Goel et al. | 348/223.1 |
| 2009/0147098 | A1* | 6/2009 | Li | 348/223.1 |

* cited by examiner

*Primary Examiner* — Tuan Ho
*Assistant Examiner* — Shahbaz Nazrul

(57) ABSTRACT

A method for determining an illuminant in a scene includes, applying, to sampled outputs of a sensor array used to capture the scene, a plurality of color-correction profiles, wherein each color-correction profile corresponds to a particular illuminant, thereby forming a plurality of color-corrected sampled outputs. The method further includes identifying the illuminant in the scene as corresponding to the color-corrected sampled output having the least color variance.

20 Claims, 3 Drawing Sheets

DETERMINING THE ILLUMINANT IN A CAPTURED SCENE

BACKGROUND

When taking pictures by way of a digital camera, if the correct illuminant is not determined, the color balance of the captured scene will be incorrect. Thus, in some instances, the captured image may appear as though the colors have been shifted in the direction of exhibiting too much orange or too much blue. These shifts in color can make faces in the image appear sickly and unflattering. In other instances, incorrectly determining the illuminant may cause tinting at various areas of the captured image. Corners may appear purple, while other sections of the captured image may be characterized by what appear to be irregular spots blotches, or stains.

DESCRIPTION OF THE EMBODIMENTS

As digital imaging sensors have become smaller and smaller, the color variance of images captured by these sensors has tended to increase as a result of variations in color shading. The inventors of the embodiments of the invention disclosed have determined that this increase in color variance due to increased color shading can be used to detect the illuminant used to illuminate a scene being captured by the sensor. In the event that the camera selects an incorrect illuminant and then applies to the raw sensor outputs a color-correction profile particular to the incorrect illuminant, the color variance of the resulting improperly color-corrected image exhibits a relatively large variance due to color shading. In contrast, when a color-correction profile particular to the correct illuminant is applied to the raw sensor outputs, the resulting color-corrected image exhibits a smaller color variance and thus smaller color shading. This property has been exploited in the embodiments of the invention disclosed herein.

Figure 1:
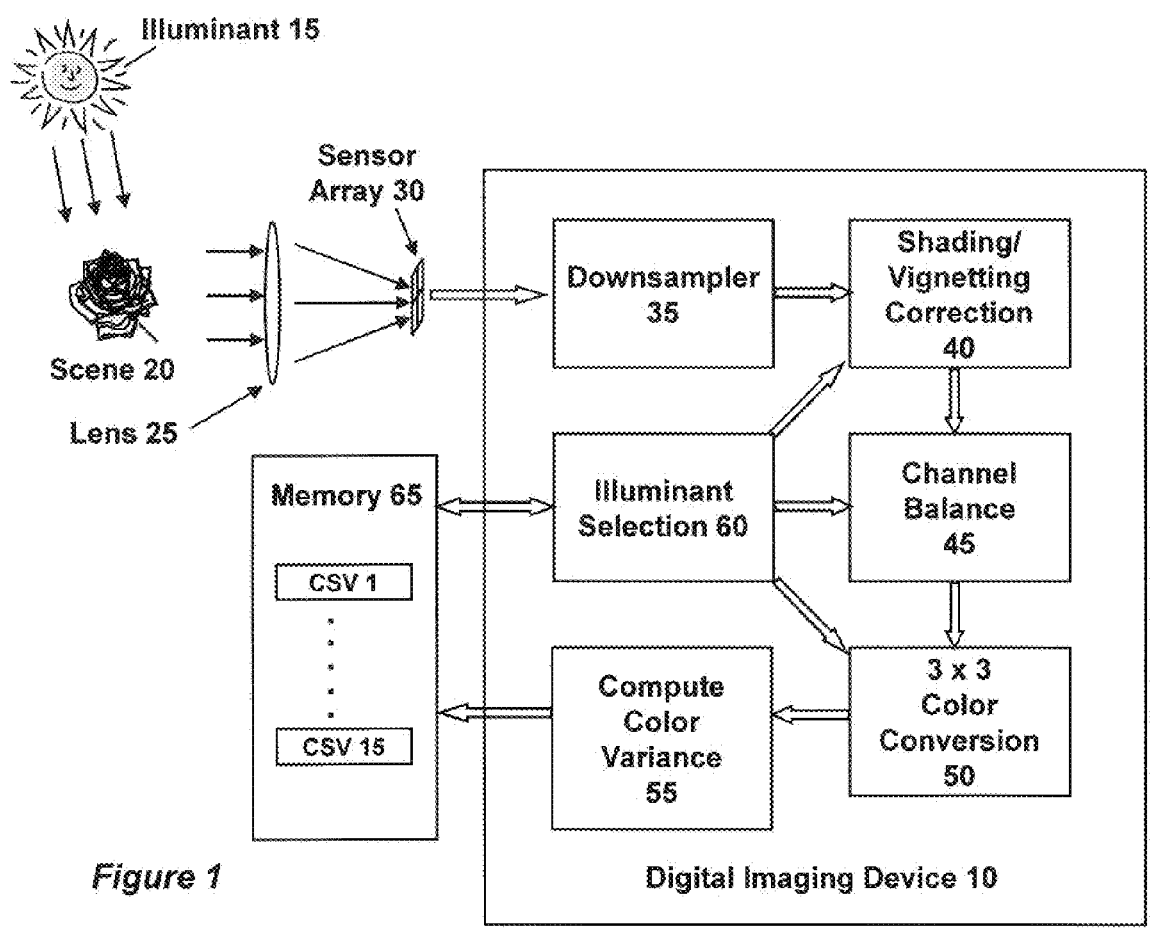
FIG. 1 is a diagram showing the functional elements of a digital imaging device that determines the illuminant in a captured scene according to an embodiment of the invention.

FIG. 1 is a diagram showing the functional elements of a digital imaging device that determines the illuminant in a captured scene according to an embodiment of the invention. In FIG. 1, digital imaging device 10 represents either a microprocessor or an application-specific integrated circuit that could be used in the image processing portion of a digital camera, camera phone, handheld computer equipped with a digital camera, or similar apparatus.

In FIG. 1, illuminant 15 represents any one of numerous illuminants that could be used to illuminate scene 20. These may include "daylight" illuminants that represent the sun at various times during the day and may include color temperatures of 7500, 6500, 5500, 5000, 4500, 4000° K. Illuminant 15 can also represent a tungsten incandescent light bulb as well as a fluorescent lamp or a flash such as the type used in many conventional digital cameras. In the example of FIG. 1, it has been contemplated that illuminant selection block 60 is capable of providing color-correction information pertinent to 15 different Illuminants.

The light reflected from scene 20 as well as light directly from illuminant 15 passes through lens 25 and is incident on sensor array 30. Although not shown in FIG. 1, it is contemplated that lens 25 includes an IR cutoff filter that blocks the transmission of light in the infrared wavelengths while passing light in the'visible wavelengths. The visible light collected by way of sensor array 30 is converted into electrical charges and conveyed to downsampler 35. In the embodiment of FIG. 1, it is, contemplated that downsampler 35 samples less than 5% of the outputs of sensor array 30. Thus, although sensor array 30 may include millions of minute optical sensors, downsampler 35 samples perhaps between 5000 and 50,000 of the outputs of sensor array 30. Downsampler 35 may also average adjacent pixels together rather than just retain the value of each pixel. By way of this averaging, the color of each downsampled pixel more accurately represents an area of the scene. And usually, pixel summing may also improve the signal to noise ratio of the downsampled outputs.

The downsampled outputs from downsampler 35 are conveyed to shading and vignetting correction block 40. Shading and vignetting correction block 40 also receives an input from illuminant selection block 60, which selects a color-correction profile for each color channel (typically R, G1, G2, B) for a selected illuminant. Shading and vignetting correction block 40 then corrects the downsampled image using the selected color-correction profile. The resulting color-corrected sampled outputs from the shading and vignetting correction block are then conveyed to channel balance block 45. At channel balance block 45, the channel balance multipliers appropriate for the selected illuminant are applied. Thus, for example, in the event that illuminant selection block 60 has, selected a "tungsten" lamp (an illuminant which includes very little blue light) channel balance multiplier block 45 may provide a large multiplier for the blue channel while providing a substantially smaller multiplier for the red and green channels.

The outputs of channel balance multiplier block 45 are then conveyed to 3×3 color conversion block 50, which serves to convert the outputs to a standard color space. In the embodiment of FIG. 1, the chosen color space is standard RGB, although nothing prevents the conversion to any other color space such as Adobe RGB, Pro Photo RGB, and so forth. The outputs of color conversion block 50 are then conveyed to compute color variance block 55 in which the color variance of the color-corrected image is computed. The values for the computed color variance (which in this example contemplates 15 Illuminants) for all selected illuminants are stored in memory 65 (CSV1 through CSV 15).

In an embodiment of the invention, compute color variance block 55 may determine the color variance in a manner that accommodates the various ways in which color shading is manifested. Thus, in block 55, delta Cb and delta Cr are histogrammed along color shading vectors. In this embodiment, consider a captured image of a uniformly white scene. Radial color shading may cause pixels to appear more purplish as the distance from the center of the image to the pixels increases. Horizontal color shading may cause pixels to appear more bluish as the distance from the left edge of the image to the pixels increases. Vertical color shading may cause pixels to appear more reddish as the distance from the top edge of the image to the pixels increases.

The color variance is calculated in a way that maximizes sensitivity to color shading by generating a histogram of delta Cb and delta Cr values along the Cb and Cr color shading vectors. Changes to Cb and Cr due to color shading occur gradually across the scene. Therefore, it may be important to compare Cb and Cr values for each pixel with neighboring pixels located some distance away. However, as the distance between the pixels increases, the probability that their corresponding scene colors will be the same decreases. In experiments in which the distance between the pixels is between 3% and 9% of the width of the image buffer, comparing the Cb and Cr values of a pixel to all pixels within this range along the corresponding color shading vector yields good results. The histogram thus produced will have a peak at 0 when proper color shading correction has been applied. Incorrect color shading correction will move the peak either to the left or right. (The absolute value of the location of the peak is the color shading variance.)

In another embodiment of the invention, compute color variance block 55 determines color variance by summing the squares of a two-dimensional Cb/Cr histogram. This approach accommodates color shading when pure colors become spread out across a range of colors. For example, blue sky pixels, instead of being uniformly blue, may be spread across a range of colors from blue to purple. The number of pure blue pixels may decrease significantly. An image with more pixels concentrated into fewer colors exhibits less color shading.

This approach accumulates all pixels into a two-dimensional histogram with Cb defining the first dimension and Cr defining the second dimension. The histogram might be 256× 256 bytes in size to accommodate 8-bit Cb and Cr values. For each pixel, the corresponding Cb/Cr bucket of the histogram is incremented. After all pixels have been tallied into the histogram, the squares of all the values in the histogram are summed. Squaring the sums generates a larger number when correct color shading has been applied since the pixels are less dispersed and are concentrated into fewer histogram buckets.

Having described two approaches toward the computation of color variance in block 55, it should also be pointed out that although not shown in FIG. 1, illuminant selection block 60 may also include a capability to interpolate shading and vignetting correction factors, channel balance multipliers, as well as 3×3 color conversion factors using either linear interpolation between two adjacent values or polynomial interpolation between two or more adjacent values. Thus, as an example, in the event that illuminant 15 is an unknown illuminant, such as daylight at 4750° K, color variance calculation can be performed by interpolating factors used for color temperatures of 4500 and 5000° K.

Figure 2:
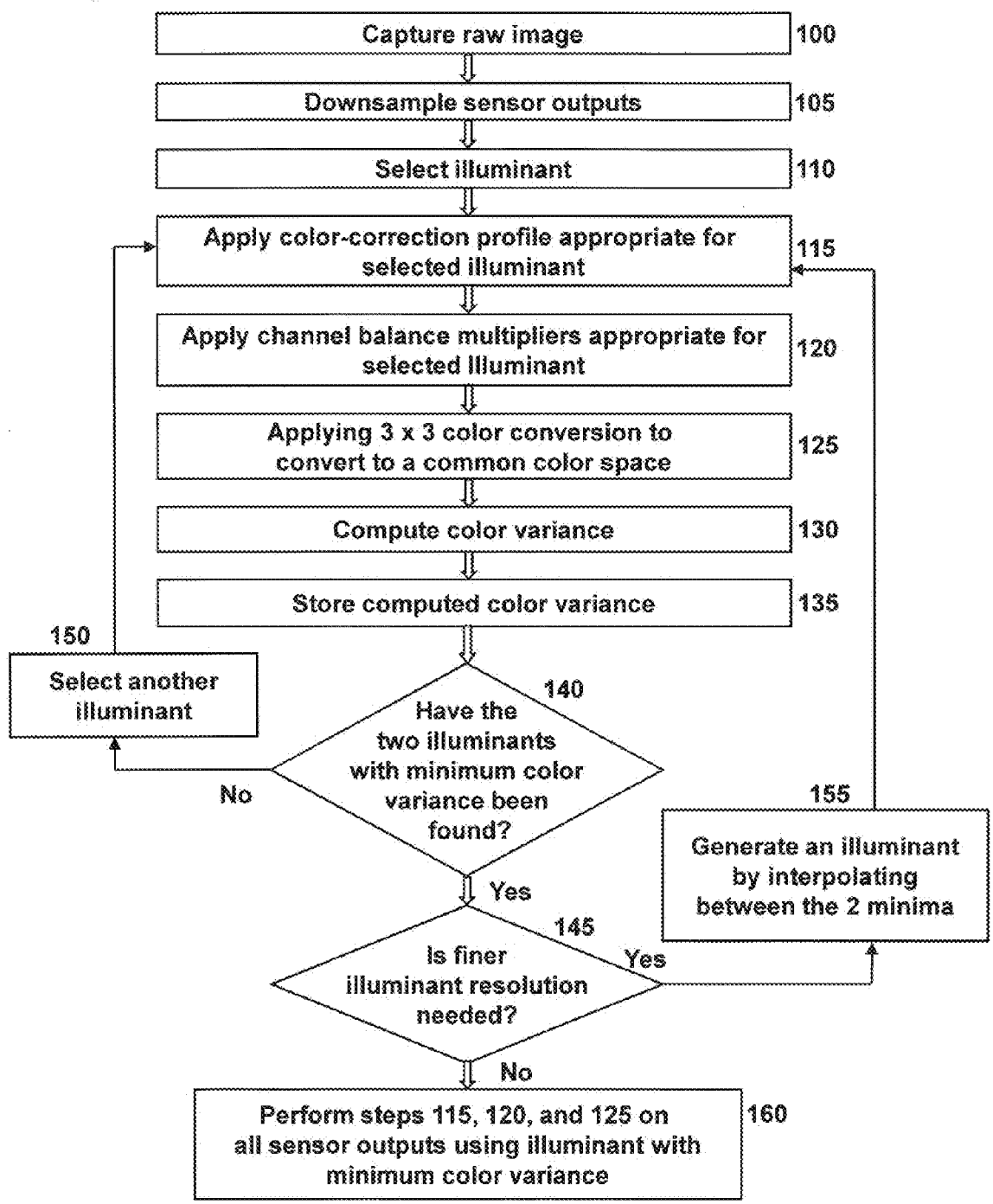
FIG. 2 is a flow chart for a method for determining the illuminant in a captured scene according to an embodiment of the invention.

FIG. 2 is a flow chart for a method for determining the illuminant in a captured scene according to an embodiment of the invention. The functional elements of the digital imaging device 10 shown in FIG. 1 may be used to perform the method of FIG. 2; however, imaging devices of other configurations may also be used to perform the method. The method of FIG. 2 begins at step 100 in which an image is captured, perhaps using the lens and sensor array of digital imaging device 10 of FIG. 1. At step 105 of FIG. 2, outputs of the sensor array are downsampled so as to minimize processing time. Although the embodiment of FIG. 2 contemplates downsampling so that less than 5% of the sensor outputs need be considered, other embodiments of the invention may perform additional downsampling (so as to obtain perhaps 1% of the sensor outputs). In still other embodiments, less downsampling may be performed so as to provide 2%, 10%, or an even greater percentage of the sensor outputs.

The method of FIG. 2 continues at step 110 in which an illuminant is selected. In one embodiment of the invention, the selected illuminant may be the illuminant selected for the last image capture. In other embodiments, the digital imaging device evaluates an entire list of perhaps as many as 15 or more illuminants, beginning at the top of the list and stepping through each entry. The method proceeds to step 115 in which, a color-correction profile for the selected illuminant is applied to the sampled outputs to form color-corrected outputs.

In the embodiment of FIG. 2, it is contemplated that the color-correction profiles applied to the downsampled outputs correct both color shading and vignetting for the selected illuminant. However, in other embodiments of the invention, the color-correction profile applied in step 115 may only correct for color shading, leaving correction for vignetting to be performed at another part of the method.

The method continues at step 120 in which channel balance multipliers appropriate for the selected illuminant are applied to the color-corrected outputs from step 115. In the example of FIG. 2, the channel balance multipliers enable the color-corrected outputs from the sensor array for a white scene to achieve substantially equal amplitudes. Thus, in an example in which the selected illuminant is "outdoor and cloudy", an illuminant that includes a significant amount of blue light, the blue channel may require a multiplication factor substantially smaller than the factor used for the red channel.

At step 125, a 3×3 color-correction matrix is applied to convert sensor data to a standard color space. In the embodiment of FIG. 2, the selected color space is sRGB. However, other embodiments of the invention may make use of other color spaces, such as Adobe RGB, Pro Photo RGB, and so forth. At step 130, the color variance of the resulting samples in the color space is determined. As previously mentioned herein, when the imaging device selects an incorrect illuminant, the color variance of the resulting color-corrected image becomes relatively large, indicating substantial color shading of the captured scene. When the correct illuminant has been selected, the color-corrected image shows smaller the color variance, indicating reduced shading of the captured scene. At step 135, the color variance for the selected illuminant is stored.

The method then proceeds to step 140 in which a decision is made as to whether there are additional illuminants to evaluate. In accordance with embodiments of the invention, between 2 and 15 illuminants may be evaluated, although nothing precludes the evaluation of greater than 15 illuminants. If the two illuminants that result in minimum color variance have not been found, the method proceeds to step 150 in which another illuminant is selected. After performing step 150, control of the method of FIG. 2 then proceeds to step 115 in which a color-correction profile appropriate for the next selected illuminant is applied to the original downsampled sensor outputs.

If two Illuminants that result in minimum color variance have been found, the method proceeds to step 145. In step 145, the two minima for color variance among the stored values for color variance are chosen. This step provides for the possibility that between two minima for color variance, there is at least one finer-resolution value of color temperature for an illuminant that would result in a color variance less than either of the two minima. Accordingly, step 155 is performed in which an interpolated value for color temperature between the two minima is generated.

At step 160 several of the previously-discussed steps (115, 120, and 125) are applied to all or at least substantially all of the outputs from the sensor array. Step 115 includes applying a color-correction profile appropriate for a selected illuminant. Step 120 includes applying channel balance multipliers. Step 125 includes applying 3×3 color conversion to convert to a color space.

Figure 3:
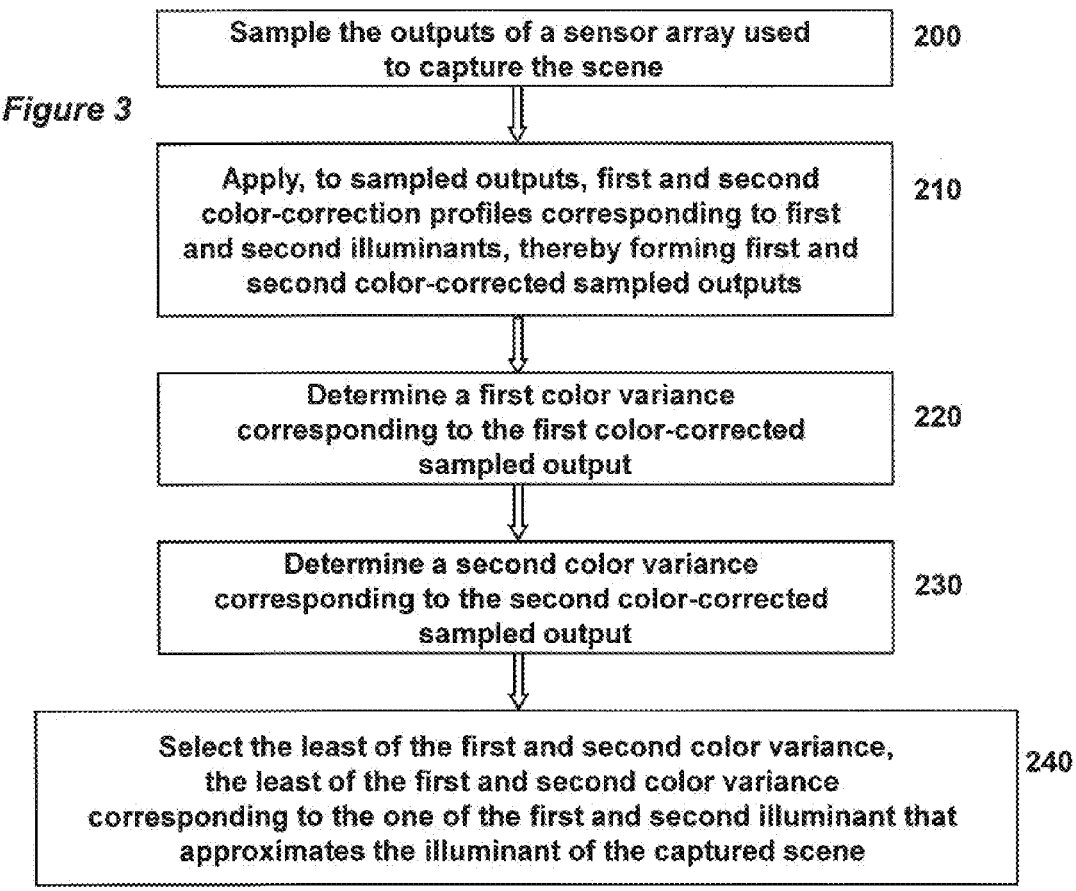
FIG. 3 is a simplified flow chart for a method for the illuminant in a captured scene according to another embodiment of the invention.

FIG. 3 is a simplified flow chart for a method for determining the illuminant in a captured scene according to another embodiment of the invention. The method includes the steps, of sampling the outputs of a sensor array used to capture the scene (step 200) and, applying, to the sampled outputs, first and second color-correction profiles corresponding to first and second illuminants (step 210), thereby forming first and second color-corrected sampled outputs. The method continues with determining a first color variance corresponding to the first color-corrected sampled output (step 220) and determining a second color variance, corresponding to the second color-corrected sampled output (step 230) and selecting the least of the first and second color variance (step 240). In step 240 the least of the first and second color variance corresponds to the illuminant that most closely approximates the illuminant of the captured scene.

Figure 4:
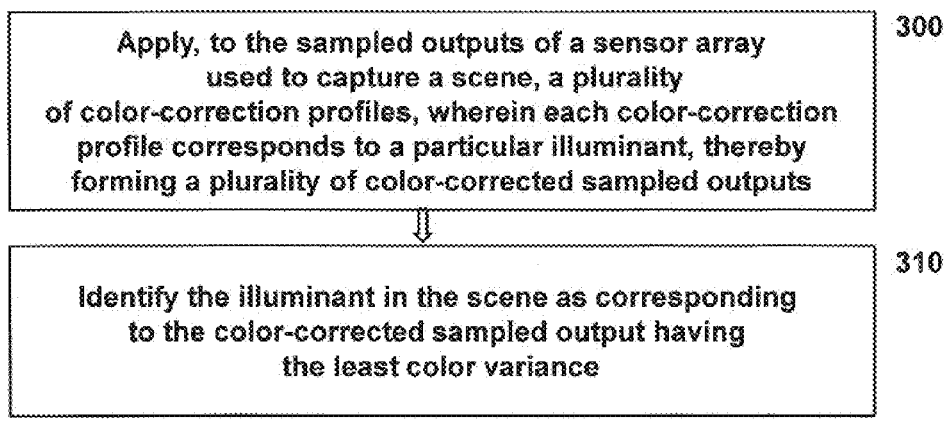
FIG. 4 is another simplified flow chart for a method for determining an illuminant in a scene according to another embodiment of the invention.

FIG. 4 is another simplified flow chart for a method for determining the illuminant in a captured scene according to another embodiment of the invention. Step 300 of the method includes applying, to the sampled outputs of a sensor array used to capture the scene, a plurality of color-correction profiles, wherein each color-correction profile corresponds to a particular illuminant, thereby forming a plurality of color-corrected sampled outputs. The method concludes with identifying the illuminant in the scene as corresponding to the color-corrected sampled output having the least color variance (step 310).

In conclusion, while the present invention has been particularly shown and described with reference to various embodiments, those skilled in the art will understand that many variations may be made therein without departing from the spirit and scope of the invention as defined in the following claims. This description of the invention should be understood to include the novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element or the equivalent thereof, such claims should be understood to include incorporation of one or more such elements, neither requiring nor excluding two or more such elements.

What is claimed is:

1. A method for determining an illuminant in a captured scene, comprising:
    downsampling a subset of the outputs of a sensor array used to capture the scene;
    applying, to the downsampled outputs, first and second color-correction profiles corresponding to first and second illuminants, thereby forming first and second color-corrected downsampled outputs;
    determining a first color variance corresponding to the first color-corrected downsampled output;
    determining a second color variance corresponding to the second color-corrected downsampled output; and
    selecting the least of the first and second color variance, the least corresponding to the one of the first and second illuminants that approximates the illuminant of the captured scene.

2. The method of claim 1, wherein the first and second color-correction profiles correct for color shading and vignetting in the captured scene.

3. The method of claim 1, further comprising converting the first and second color-corrected downsampled outputs to a color space prior to determining the first color variance and the second color variance.

4. The method of claim 3, further comprising applying channel balance multipliers appropriate for the first and second illuminants prior to the converting step.

5. The method of claim 1, further comprising:
    applying, to the downsampled outputs, a third color-correction profile corresponding to a third illuminant, the third illuminant having a color temperature between the first and second illuminants, thereby forming a third color-corrected downsampled output;
    determining a third color variance corresponding to the third color-corrected downsampled output; and
    selecting the third color variance when the third color variance is less than the least of the first and second color variance, the third color variance corresponding to the illuminant that most closely approximates the illuminant of the captured scene.

6. The method of claim 1, wherein the downsampling step includes downsampling fewer than 5% of the outputs of the sensor array.

7. The method of claim 6, wherein the downsampling step includes averaging adjacent pixels of the sensor array.

8. The method of claim 1, further comprising selecting white balance correction factors based on the approximated illuminant of the captured scene.

9. A method for determining an illuminant in a scene, comprising:
    applying, to downsampled outputs of a sensor array used to capture the scene, a plurality of color-correction profiles, wherein each color-correction profile corresponds to a particular illuminant, thereby forming a plurality of color-corrected downsampled outputs; and
    identifying the illuminant in the scene as corresponding to the color-corrected downsampled output having the least color variance.

10. The method of claim 9, wherein the applying step includes downsampling less than 5% of the outputs of the sensor array used to capture the scene.

11. The method of claim 9, further comprising:
    applying, to the downsampled outputs of the sensor array used to capture the scene, an interpolated color-correction profile, wherein the interpolated color-correction profile results from calculating color-correction factors from at least two color-correction profiles.

12. The method of claim 9, further comprising capturing the scene using a digital camera, the capturing step occurring prior to the applying step.

13. The method of claim 9, further comprising applying channel balance multipliers to the plurality of color-corrected downsampled outputs prior to the identifying step.

14. The method of claim 13, further comprising applying a 3×3 color conversion matrix to convert the color-corrected downsampled outputs to a standard color space.

15. A digital imaging device comprising:
    a downsampler for downsampling a subset of outputs from a sensor array;
    an illuminant selection module for applying a plurality of illuminant-dependent color-correction profiles to the downsampled outputs;
    a color conversion module for converting the plurality of color-corrected downsampled outputs to a color space; and
    a module for computing the color variance of the outputs of the color conversion module, wherein the module for computing the color variance determines an illuminant from among a plurality of illuminants based on the illuminant having a minimum value of color variance.

16. The digital imaging device of claim 15, wherein the illuminant selection module applies between 2 and 15 illuminant-dependent color-correction profiles to the downsampled outputs.

17. The digital imaging device of claim 15, wherein the illuminant selection module additionally applies illuminant-dependent channel balance multipliers to the downsampled outputs.

18. The digital imaging device of claim 15, wherein the illuminant selection module additionally applies interpolated values of one of the group consisting of shading and vignetting correction factors, channel balance multipliers, and 3×3 color conversion factors.

19. The digital imaging device of claim 18, wherein the illuminant selection module generates the interpolated values using linear interpolation between adjacent values.

20. The digital imaging device of claim 18, wherein the illuminant selection module generates the interpolated values using polynomial interpolation.

* * * * *